(12) United States Patent
Solivan

(10) Patent No.: US 6,707,281 B2
(45) Date of Patent: Mar. 16, 2004

(54) METHOD AND APPARATUS FOR OPERATING A VOLTAGE REGULATOR BASED ON INDUCTOR CURRENT DETECTION

(75) Inventor: Thovane Solivan, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/187,218

(22) Filed: Jun. 28, 2002

(65) Prior Publication Data

US 2004/0000895 A1 Jan. 1, 2004

(51) Int. Cl.[7] ............................................... G05F 1/613
(52) U.S. Cl. ....................... 323/225; 323/271; 323/284; 323/285; 323/350
(58) Field of Search ................................. 323/225, 271, 323/284, 285, 350, 351

(56) References Cited

U.S. PATENT DOCUMENTS

| | | | | |
|---|---|---|---|---|
| 5,955,872 A | * | 9/1999 | Grimm | 323/284 |
| 6,057,675 A | * | 5/2000 | Tateishi | 323/225 |
| 6,396,252 B1 | * | 5/2002 | Culpepper et al. | 323/285 |
| 6,583,610 B2 | * | 6/2003 | Groom et al. | 323/271 |

* cited by examiner

Primary Examiner—Jeffrey Sterett
(74) Attorney, Agent, or Firm—Blakely, Sokoloff, Taylor & Zafman LLP

(57) ABSTRACT

In accordance with an embodiment of the disclosed matter, a voltage regulator may supply power to one or more components within a computer system. The voltage regulator may include an inductor and a current detection circuit to detect current through the inductor. When the inductor current is detected to be above a threshold, the voltage regulator operates synchronously. When the inductor current is detected to be below the threshold, the voltage regulator operates non-synchronously.

26 Claims, 5 Drawing Sheets

METHOD AND APPARATUS FOR OPERATING A VOLTAGE REGULATOR BASED ON INDUCTOR CURRENT DETECTION

An embodiment of the disclosed matter relates to computer systems and more particularly to adjusting the operation of a voltage regulator depending on a signal that indicates a current through an inductor of the voltage regulator.

BACKGROUND

Computer systems are becoming increasingly pervasive in our society, including everything from small handheld electronic devices, such as personal data assistants and cellular phones, to application-specific electronic devices, such as set-top boxes, digital cameras and other consumer electronics, to medium-sized mobile systems such as notebook and tablet computers, to desktop systems, workstations, and servers. Computer systems typically include one or more processors. A processor manipulates and controls the flow of data in a computer by executing instructions. To provide more powerful computer systems for consumers, processor designers strive to continually increase the operating speed of the processor. Unfortunately, as processor speed increases, the power consumed by the processor tends to increase as well.

Historically, the power consumed by a computer system has been limited by two factors. First, as power consumption increases, the computer tends to run hotter, leading to thermal dissipation problems. Second, the power consumed by a computer system may tax the limits of the power supply used to keep the system operational, reducing battery life in mobile systems and diminishing reliability while increasing cost in larger systems.

One method of reducing the amount of power consumed by a computer system is to design the system such that it is capable of operating in two different states. In a first state of operation, only the most vital functions of the system, such as those dedicated to monitoring for user input, may be active. This may be referred to as a "sleep state." During the sleep state, the computer system may consume very little power from a voltage regulator (alternatively referred to as a power supply, power source, voltage supply, voltage source, Vcc supply, or Vcc source). In a second state of operation, the computer system may be busy executing instructions to accomplish a particular task. This may be referred to as a "wake state." During the wake state, the computer system may consume a greater amount of power from a voltage regulator. Various components of the computer system similarly operate in sleep and wake states. The definition of these states, with respect to the individual components, may be particular to the design and function of the components.

Unfortunately, various components of a computer system, such as a voltage regulator, may be designed to operate more efficiently during one state than during another. This may result in poor average power consumption over an extended period of time.

One or more embodiments of the disclosed matter may address one or more of these issues.

BRIEF DESCRIPTION OF THE DRAWINGS

Embodiments are illustrated by way of example and not limitation in the accompanying figures in which like references may indicate similar elements and in which.

DETAILED DESCRIPTION

In accordance with an embodiment of the disclosed matter, a voltage regulator may supply power (alternatively referred to as a supply voltage or Vcc) to one or more components within a computer system. The voltage regulator may include an inductor and a current detection circuit to detect current through the inductor. When the inductor current is detected to be above a threshold, the voltage regulator operates synchronously. When the inductor current is detected to be below the threshold, a pull-down power transistor of the voltage regulator may be turned off, causing the voltage regulator to operate non-synchronously during a period of time in which pull-up and pull-down power transistors are both turned off. For one embodiment, the threshold is approximately 0 amps.

In accordance with one embodiment of the disclosed matter, a signal line may be coupled to the voltage regulator to provide a signal that indicates whether or not the target voltage level of the power supplied by the voltage regulator is changing. For this embodiment, if the inductor current is detected to be below the threshold, the voltage regulator may still operate synchronously if the signal indicates that the target voltage level is changing. If the inductor current is detected to be below the threshold and the signal indicates that the target voltage level is stable (unchanging), then a pull-down power transistor of the voltage regulator may be turned off. This causes the voltage regulator to operate non-synchronously during a period of time in which pull-up and pull-down power transistors are both turned off.

A more detailed description of embodiments of the disclosed matter, including various configurations and implementations, is provided below.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur.

Figure 1:
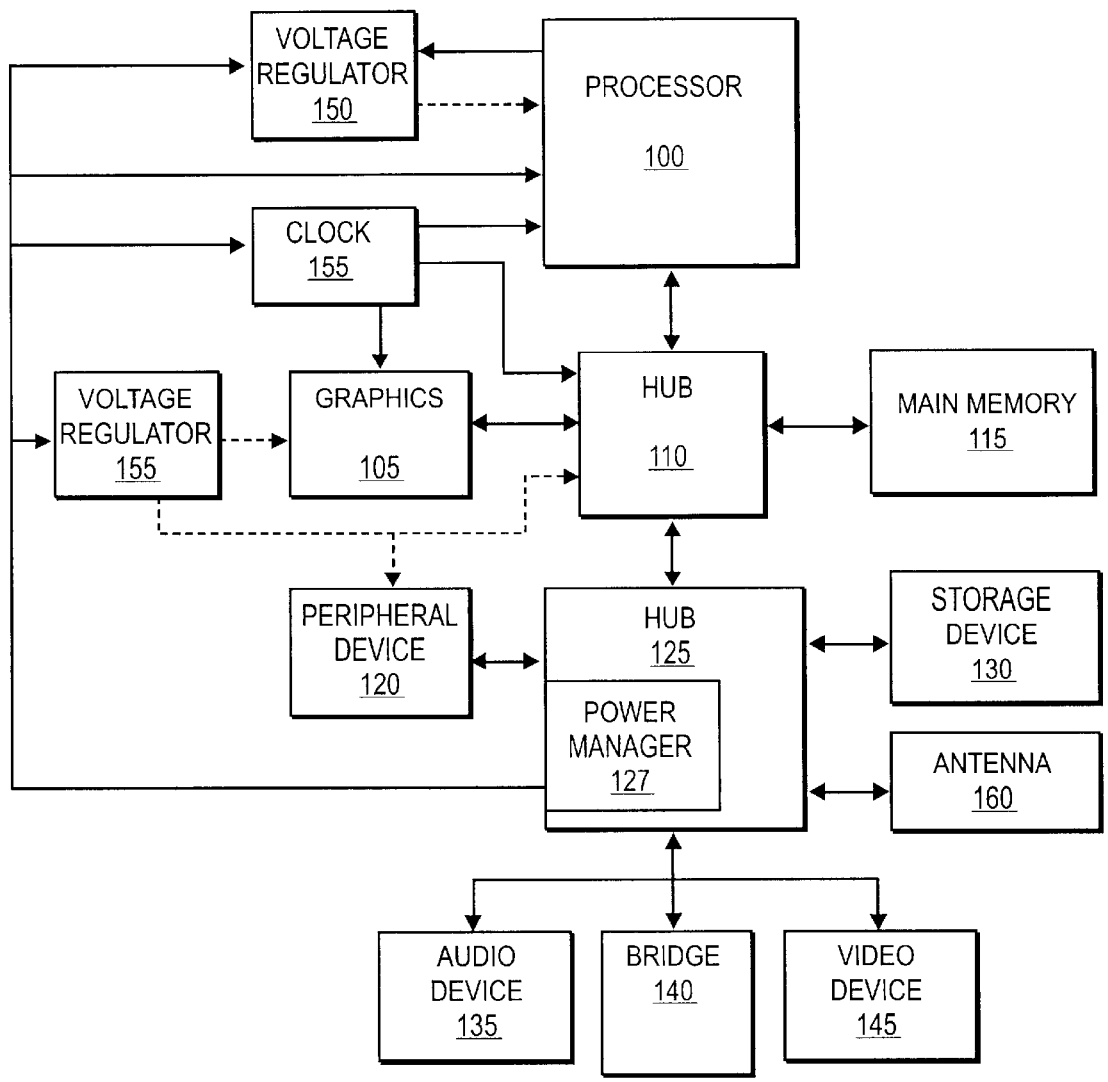
FIG. 1 includes an example of a computer system.

FIG. 1 includes an example of a computer system. As shown, the computer system may include a processor 100 coupled to hub 110. Voltage regulator 150 may supply power to processor 100, and clock 155 may provide a clock signal to processor 100. Processor 100 may communicate with graphics controller 105, main memory 115, and hub 125 via hub 110. Hub 125 may couple peripheral device 120, storage device 130, audio device 135, video device 145, antenna 160, and bridge 140 to hub 110. Voltage regulator 155 may supply power to graphics controller 105, peripheral device 120, and hub 110.

Voltage regulators 150 and 155 of FIG. 1 may supply power to one or more components of the computer system, and may receive signals indicating one or more power states or operating conditions of the one or more components powered by the voltage regulators. In accordance with one embodiment, the voltage level of the power supplied by a voltage regulator may be provided at a target voltage level determined by the design characteristics of the voltage regulator. The target voltage level may additionally be determined by a signal provided to the voltage regulator indicating a target voltage level desired by the one or more components powered by the voltage regulator. For example, processor 100 may be capable of operating at two or more different target voltage levels associated with two or more different performance modes, and processor 100 may indicate its desired target voltage level to voltage regulator 150.

Audio device 135 of FIG. 1 may include, for example, a speaker, a microphone, or other input/output device. Video device 145 may include, for example, a display screen, a camera, or other video input/output device. Bridge 140 may couple hub 125 to one or more additional buses coupled to one or more additional peripheral devices. Antenna 160 may couple the computer system to one or more wireless networks in accordance with one or more wireless communication protocols. Peripheral device 120 may be one or more other peripheral devices.

Hub 125 of FIG. 1 may include a power manager 127. Power manager 127 may send power state signals to voltage regulators 150 and 155, processor 100 and clock 155. These power state signals may indicate the power states of one or more components of the computer system. In accordance with an alternate embodiment, power manager 127 may reside within a different component of the computer system, may be a discrete component, or may be distributed among multiple components of the computer system. For example, each component coupled to a voltage regulator may send its own power state signal separately to the voltage regulator to indicate its power state. It is to be noted that the power state signal provided to the voltage regulator may indicate a power state transition of an associated component (or of multiple components) before, after, or during the power state transition of the component.

In accordance with an embodiment, a computer system may include more or fewer components than those shown in FIG. 1, and the components of FIG. 1 may be partitioned differently. For example, multiple components may be integrated into a single component, and single components may be divided into multiple components. Note that the term "processor" may be used herein to refer to one or more of a central processing unit, a processor of a symmetric or asymmetric multiprocessing system, a digital signal processor, a micro-controller, etc.

Figure 2A:
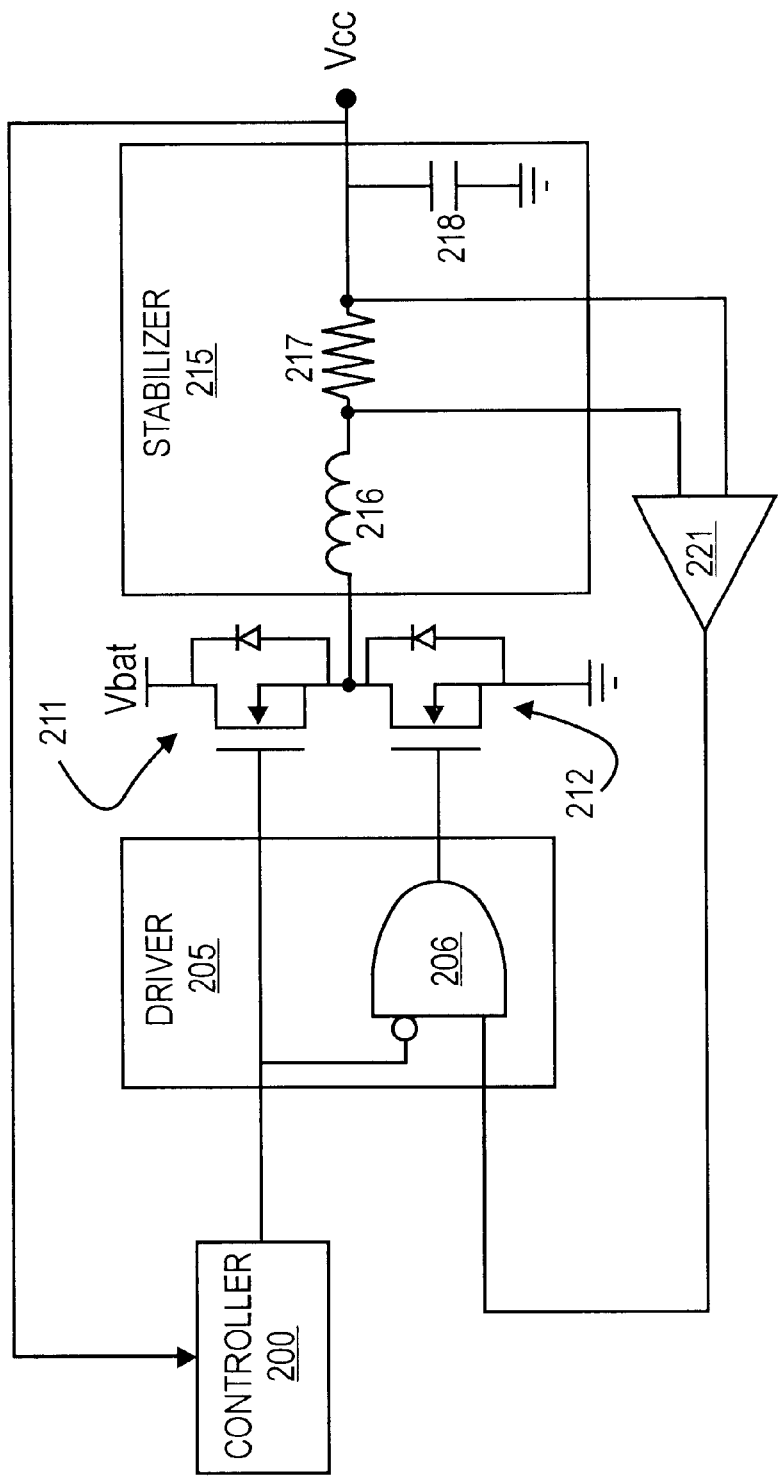
FIGS. 2A, 2B, and 2C include examples of voltage regulators.

FIG. 2A includes an example of a switching voltage regulator in accordance with an embodiment of the disclosed matter. The voltage regulator of FIG. 2A may supply power to one or more components of a computer system, such as a processor. As shown, the voltage regulator includes a controller 200 to control the switching of pull-up power transistor 211 and pull-down power transistor 212 to set the appropriate supply voltage, Vcc. When turned on, pull-up power transistor 211 pulls the output supply voltage, Vcc, up toward Vbat, which may be, for example, a battery voltage or other voltage that is higher than Vcc. Pull-down power transistor 212 pulls the output supply voltage down toward ground when turned on. The supply voltage, Vcc, may be fed back to controller 200 for comparison to a reference voltage to maintain a target voltage level.

Driver 205 of FIG. 2A may operate the power transistors according to signals provided from controller 200. Driver 205 may include an AND gate having an inverting input coupled to the gate of pull-up power transistor 211 and a non-inverting input coupled to an output of comparator 221. The output of AND gate 206 may be coupled to the gate of pull-down power transistor 212. The node between pull-up and pull-down power transistors 211 and 212 may be coupled to stabilizer circuit 215. Stabilizer circuit 215 may include inductor 216, resistor 217 in series with inductor 216, and capacitor 218, to stabilize and smooth the output supply voltage Vcc by eliminating ripples created by the switching of power transistors 211 and 212. The node at one end of resistor 217 may be coupled to a first input of comparator 217, and the node at the other end of resistor 217 may be coupled to the other input of comparator 217.

In accordance with alternate embodiments, a voltage regulator may be defined to include more or fewer circuit elements than those shown in FIG. 2A, and the voltage regulator of FIG. 2A may be partitioned differently. For example, multiple elements may be integrated into a single component, and single elements may be divided into multiple components.

In accordance with one embodiment of the disclosed matter, a current detection circuit includes resistor 217 coupled to comparator 221 of FIG. 2A. In this configuration, comparator 221 may compare the voltage at one end of resistor 217 to the voltage at the other end of the resistor. Based on this comparison, comparator 221 may provide a logical signal to AND gate 206. In accordance with one embodiment of the disclosed matter, comparator 221 may provide a logically high signal when the voltage between inductor 216 and resistor 217 is higher than the voltage between resistor 217 and capacitor 218. For this embodiment, comparator 221 may provide a logically low signal when the voltage between inductor 216 and resistor 217 is lower than the voltage between resistor 217 and capacitor 218. In this manner, the current detection circuit may detect the direction of current through resistor 217.

Because resistor 217 may be placed in series with inductor 216, the detection circuit of FIG. 2A may detect (albeit indirectly) the current through inductor 216. Accordingly, the comparator may provide a logically high signal when the current flows from pull-up power transistor 211, through inductor 217, and the comparator may provide a logically low signal when the current flows from inductor 217 through pull-down power transistor 212. In other words, when the current is positive (i.e. greater than 0 amps), the comparator may provide a logically high signal, and when the current is negative (i.e. less than 0 amps), the comparator may provide a logically low signal. In accordance with an embodiment of the disclosed matter, the current may become negative when the component powered by the voltage regulator is in a sleep state.

In accordance with an alternate embodiment of the disclosed matter, the threshold above or below which the comparator may provide a logically high or low signal may be designed to be a value other than 0 amps. For example, resistor ladders may be used at the inputs to comparator 221 of FIG. 2A to adjust this threshold. In accordance with one embodiment of the disclosed matter, the threshold may be set to a level associated with a leakage current of one or more components powered by the voltage regulator. The leakage current may be the amount of current consumed by the one or more components in a sleep state.

AND gate 206 of FIG. 2A acts as a pass gate. AND gate 206 allows an inverse of the pull-up signal that controls pull-up power transistor 211 to control pull-down power transistor 212 depending on the signal provided to the non-inverting input of AND gate 206. For example, when the output of comparator 221 is logically high, indicating that current through inductor 216 is above a threshold, the signal at the inverting input to AND gate 206 is allowed to pass through to the gate of pull-down power transistor 212.

Under these conditions, power transistors 211 and 212 operate synchronously at a switching frequency determined by controller 200.

Conversely, when the signal provided at the output of comparator 221 is logically low, indicating that current through inductor 216 and resistor 217 is below a threshold, the signal at the inverting input to AND gate 206 of FIG. 2A is prevented from passing through to the gate of pull-down power transistor 212. Under these conditions, pull-down power transistor 212 is turned off, causing the voltage regulator to operate non-synchronously during a period of time in which pull-up and pull-down power trahsistors are both turned off. Current flowing from inductor 216 through pull-down power transistor 212 may be reduced when the pull-down power transistor is turned off, thereby improving the power conversion efficiency of the voltage regulator.

Note that in accordance with an alternate embodiment, the signal provided at the output of comparator 221 may be logically low to indicate that the current through inductor 216 is positive, and logically high to indicate that the current through the inductor is negative. For this embodiment, the pass gate represented by AND gate 206 may be modified to accommodate the inverted logic by, for example, replacing AND gate 206 with a NOR gate having non-inverting inputs.

Figure 2B:
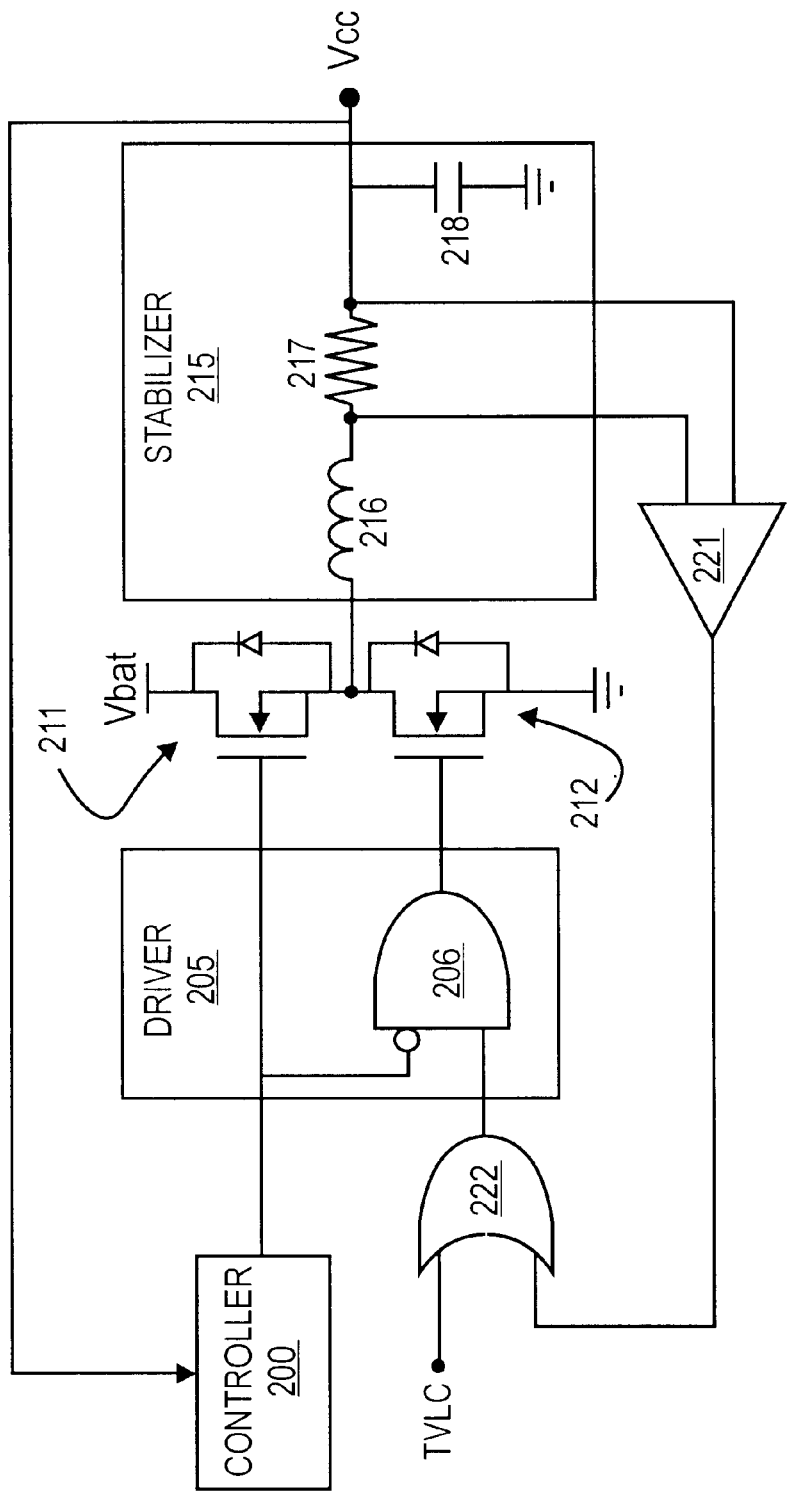

FIG. 2B includes an example of a switching voltage regulator in accordance with an alternate embodiment of the disclosed matter. The voltage regulator of FIG. 2B may be similar to the voltage regulator of FIG. 2A. The voltage regulator of FIG. 2B, however, may include an OR gate 222 to receive, at its input, the signal provided at the output of comparator 221 and a target voltage level change signal (TVLC). The TVLC signal may be provided to an input port of the voltage regulator from a component of the computer system via a signal line coupled between the component and the voltage regulator. The TVLC signal may indicate whether or not the target voltage level of the power supplied by the voltage regulator, Vcc, is changing. In accordance with an embodiment, the TVLC signal may be logically high when the target voltage level changes, and logically low when the target voltage level remains unchanged.

For example, for one embodiment, the voltage regulator of FIG. 2B may supply power to a processor at a first target voltage level when the processor is in a high performance state. When the processor transitions to a low performance state, the target voltage level may be decreased to a second target voltage level. During the target voltage level transition, the processor may provide a TVLC signal to the voltage regulator to indicate that the target voltage level is changing. Upon reaching the second target voltage level, the TVLC signal may indicate that the target voltage level is stable. To reduce the time it takes for the target voltage level to transition from the first to the second target voltage level, it may be found advantageous to operate the voltage regulator synchronously during the transition, even if current is allowed to flow through inductor 216 through pull-down power transistor 212.

In accordance with the embodiment of FIG. 2B, the signal provided at the output of OR gate 222 is provided to the non-inverting input of AND gate 206. Thus, the signal at the inverting input to AND gate 206 is allowed to pass through to the gate of pull-down power transistor 212 if either the TVLC signal is logically high or the signal provided at the output of comparator 221 is logically high. For this embodiment, if the inductor current is detected to be below the threshold, the voltage regulator may still operate synchronously if the TVLC signal indicates that the target voltage level is changing. If the inductor current is detected to be below the threshold and the TVLC signal indicates that the target voltage level is stable (unchanging), then pull-down power transistor 212 may be turned off. As a result, the voltage regulator operates non-synchronously during a period of time in which pull-up and pull-down power transistors are both turned off.

Figure 2C:
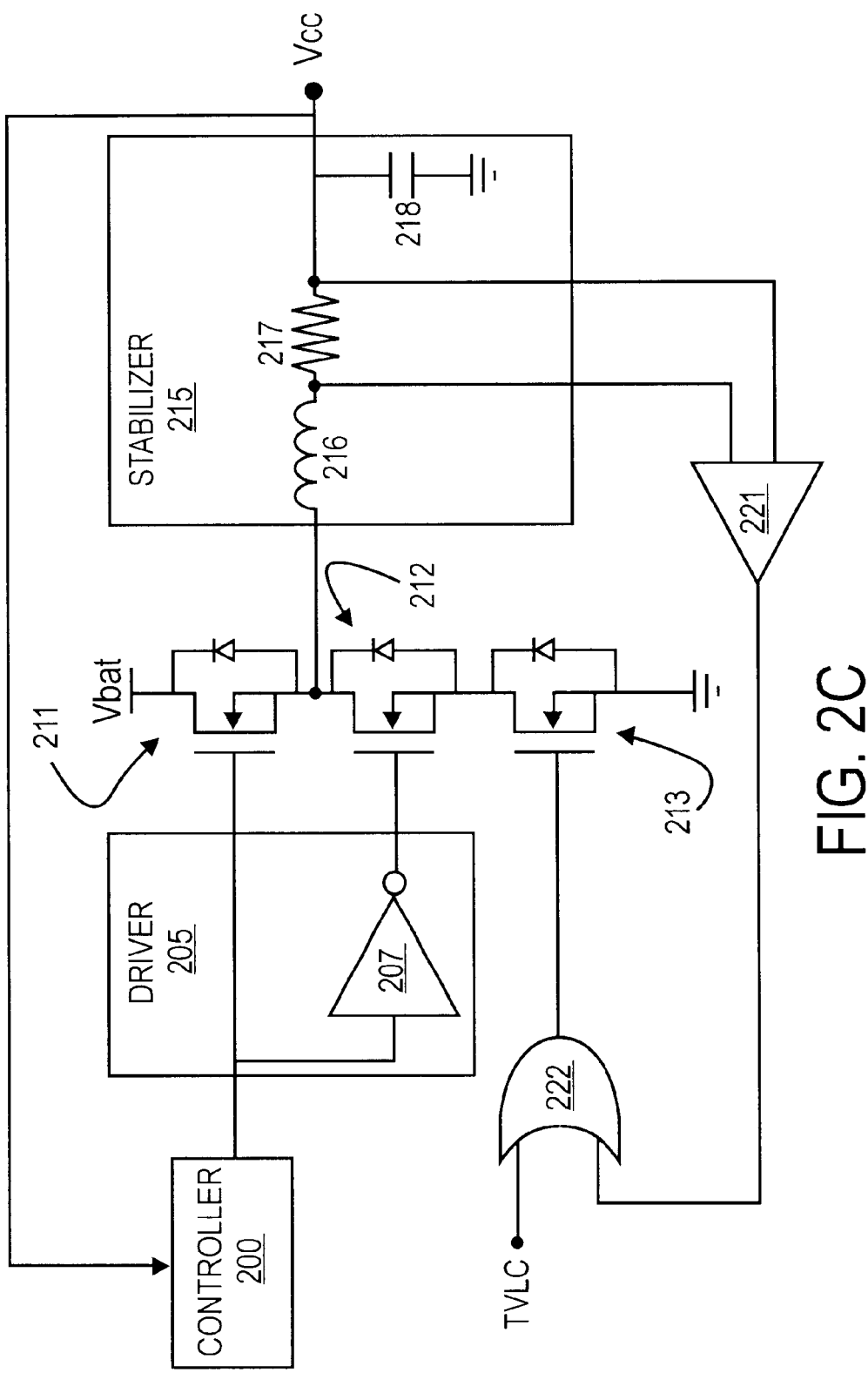

FIG. 2C includes an example of a switching voltage regulator in accordance with an alternate embodiment of the disclosed matter. The voltage regulator of FIG. 2C may be similar to the voltage regulator of FIG. 2B. The voltage regulator of FIG. 2C, however, includes an additional pull-down power transistor 213 having a gate coupled to the output of OR gate 222. In addition, driver 205 includes inverter 207 to replace the inverting input of AND gate 206 of FIG. 2B. The input to inverter 207 is coupled to the gate of pull-up power transistor 211, and the output of inverter is coupled to the gate of pull-down power transistor 212.

The voltage regulator of FIG. 2C may operate in much the same way as the voltage regulator of FIG. 2B described above. For the embodiment of FIG. 2C, however, pull-down power transistor 212 may operate synchronously with pull-up power transistor 211 regardless of the signal provided at the output of OR gate 222. The power transistors collectively, however, operate non-synchronously when the output of OR gate 222 is logically low. When the output of OR gate 222 is logically low, pull-down power transistor 213 may be turned off, causing the voltage regulator to operate non-synchronously during a period of time in which pull-up and pull-down power transistors are both turned off.

Figure 3:
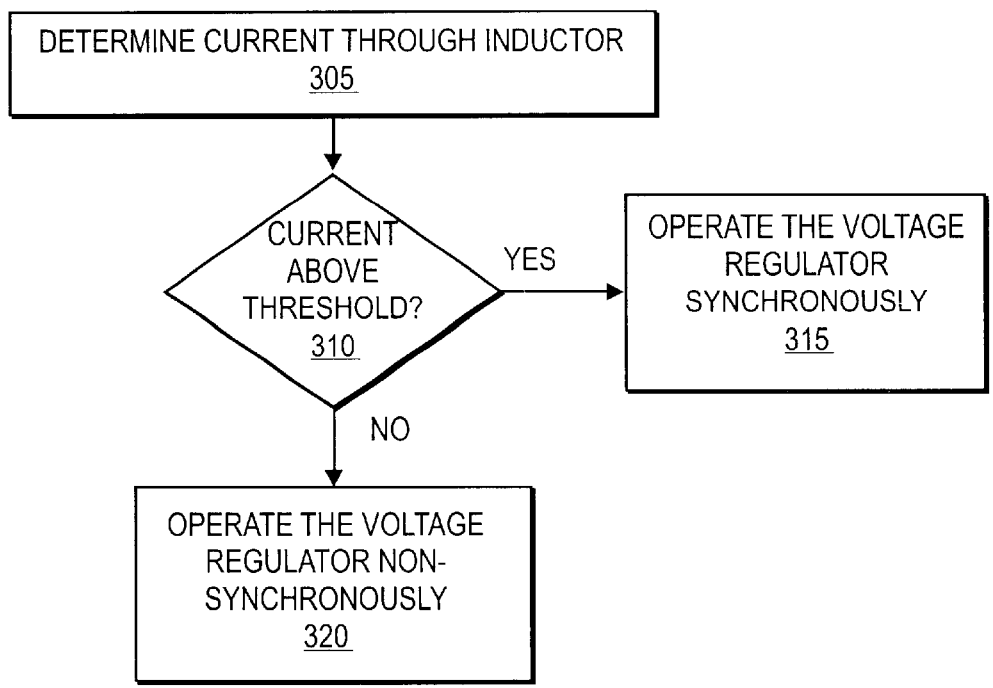
FIG. 3 includes a flow chart.

FIG. 3 includes a flow chart illustrating a method of the disclosed matter. At block 305, current is detected through an inductor using a current detection circuit. If, at block 310, it is determined that the current is above a threshold (e.g. above 0 amps, or positive), then at block 315 the voltage regulator is operated synchronously. If, however, it is determined at block 310 that the current is below a threshold (e.g. below 0 amps, or negative), then at block 320 the voltage regulator is operated non-synchronously.

The disclosed subject matter has been described with reference to specific embodiments thereof. It will, however, be evident to persons having the benefit of this disclosure that various modifications and changes may be made to these embodiments without departing from the broader spirit and scope of the invention as set forth in the appended claims and their equivalents. The specification and drawings are, accordingly, to be regarded in an illustrative rather than a restrictive sense.

What is claimed is:

1. A voltage regulator comprising:
   an inductor;
   a current detection circuit to detect current through the inductor;
   a plurality of power transistors coupled to the inductor and the current detection circuit; and
   a driver, coupled to the plurality of transistors and the current detection mechanism, to cause the transistors to operate synchronously when the circuit detects that the current is above a threshold, and to cause one or more of the transistors to be turned off when the circuit detects that the current is below the threshold.

2. The voltage regulator of claim 1, further comprising a controller, coupled to the driver, to control the switching of the plurality of transistors.

3. The voltage regulator of claim 2, further comprising an output coupled to the controller, to supply power at a target voltage level.

4. The voltage regulator of claim 3, wherein a pull-down power transistor of the plurality of power transistors is to be turned off when the current detection circuit detects that the current is below the threshold and the the controller detects that the target voltage level is to remain unchanged.

5. The voltage regulator of claim 3, wherein the plurality of power transistors are to operate synchronously when the current detection circuit detects that the current is below the threshold and the the controller detects that the target voltage level is to change.

6. The voltage regulator of claim 5, wherein a pull-down power transistor of the plurality of power transistors is to be turned off when the current detection circuit detects that the current is below the threshold and the the controller detects that the target voltage level is to remain unchanged.

7. The voltage regulator of claim 1, wherein the current detection circuit includes a resistor and a comparator to detect a voltage across the resistor.

8. The voltage regulator of claim 7, wherein the threshold is approximately 0 amps.

9. The voltage regulator of claim 1, wherein the threshold is approximately 0 amps.

10. The voltage regulator of claim 1, wherein the plurality of power transistors includes a pull-up power transistor coupled to the inductor, and a pull-down power transistor coupled to the inductor and to ground.

11. The voltage regulator of claim 1, wherein the plurality of power transistors includes a pull-up power transistor coupled to the inductor, a first pull-down power transistor coupled to the inductor, and a second pull-down power transistor coupled to the first pull-down power transistor and to ground.

12. A computer system comprising:
a component; and
a voltage regulator having:
an inductor;
a current detection circuit to detect current through the inductor; and
a plurality of power transistors coupled to the inductor and the current detection circuit; and
a driver, coupled to the plurality of transistors and the current detection mechanism, to cause the transistors to operate synchronously when the circuit detects that the current is above a threshold, and to cause one or more of the transistors to be turned off when the circuit detects that the current is below the threshold.

13. The computer system of claim 12, wherein the voltage regular further comprises a controller, coupled to the driver, to control the switching of the plurality of transistors.

14. The computer system of claim 13, wherein the threshold is approximately 0 amps.

15. The computer system of claim 13, wherein the voltage regulator further comprises an output, coupled to the controller, to supply power at a target voltage level.

16. The computer system of claim 15, wherein the voltage regulator is to operate synchronously when the current is above a threshold, non-synchronously when the current is below the threshold and the the controller detects that the target voltage level is to remain unchanged, and synchronously when the current is below the threshold and the the controller detects that the target voltage level is to change.

17. The computer system of claim 16, wherein the threshold is approximately 0 amps.

18. The computer system of claim 15, wherein the voltage regulator is to operate synchronously or non-synchronously depending on the target voltage level and the output of the current detection mechanism.

19. The computer system of claim 18, wherein the component is a processor to operate at a plurality of target voltage levels.

20. The computer system of claim 19, wherein the processor is coupled to the voltage regulator via the signal line, the processor to provide the signal to the voltage regulator.

21. A method comprising:
determining a current through an inductor of a voltage regulator;
operating the voltage regulator synchronously when the current is determined to be above a threshold; and
operating the voltage regulator non-synchronously when the current is determined to be below the threshold.

22. The method of claim 21, wherein the threshold is approximately 0 amps.

23. The method of claim 21, wherein determining comprises detecting a voltage across a resistor in series with the inductor.

24. The method of claim 21, wherein operating the voltage regulator non-synchronously includes operating the voltage regulator non-synchronously when the current is determined to be below the threshold and a target voltage level of power supplied by the voltage regulator is determined to remain unchanged.

25. The method of claim 24, further comprising operating the voltage regulator synchronously when the current is determined to be below the threshold and a target voltage level of power supplied by the voltage regulator is determined to change.

26. The method of claim 21, further comprising operating the voltage regulator synchronously when the current is determined to be below the threshold and a target voltage level of power supplied by the voltage regulator is determined to change.

* * * * *